United States Patent [19]
Arai

[11] 4,121,251
[45] Oct. 17, 1978

[54] METHOD OF DETECTING A SYNCHRONIZING LIGHT BEAM

[75] Inventor: Noboru Arai, Asaka, Japan

[73] Assignee: Fuji Photo Film Co., Ltd., Minamiashigara, Japan

[21] Appl. No.: 791,404

[22] Filed: Apr. 27, 1977

[30] Foreign Application Priority Data

Apr. 28, 1976 [JP] Japan .......................... 51-49085

[51] Int. Cl.² .................... H04N 5/84; H04N 5/06; H04N 5/08; H04N 5/74
[52] U.S. Cl. .................................. 358/150; 358/208; 358/293; 358/265; 358/130
[58] Field of Search ............... 358/208, 209, 206, 148, 358/151, 302, 130, 132, 214–216, 264, 265, 285, 237, 292, 293, 54, 63, 6, 231, 232, 150; 346/108, 109, 110 R; 350/285; 250/235, 236

[56] References Cited
U.S. PATENT DOCUMENTS

| | | | |
|---|---|---|---|
| 3,574,469 | 4/1971 | Emerson | 358/293 |
| 3,848,087 | 11/1974 | Carrell | 358/264 |
| 4,024,341 | 5/1977 | Takahashi | 358/206 |
| 4,028,732 | 6/1977 | Salter et al. | 358/264 |

*Primary Examiner*—John C. Martin
*Attorney, Agent, or Firm*—Gerald J. Ferguson, Jr.; Joseph J. Baker

[57] ABSTRACT

In a light beam scanning system for recording or displaying information by use of a scanning light beam modulated by a video signal, a synchronizing signal is obtained by detecting the scanning light beam while the light beam scans lines. The scanning light beam is detected at a predetermined position optically separated from the lines. The light beam focused on a recording material or a cathode ray tube diverges after it passes through the plane of focus. A photodetector for receiving the light beam to obtain a synchronizing signal is located where the diameter of the cross section of the light beam is larger than that of the light beam focused on the recording material or the cathode ray tube. The large diameter is obtained where the light beam diverges or is focused again by use of a focusing lens which is located at a longer distance from the photodetector than from the recording material or the cathode ray tube.

5 Claims, 4 Drawing Figures

METHOD OF DETECTING A SYNCHRONIZING LIGHT BEAM

BACKGROUND OF THE INVENTION

1. Field of the Invention

This invention relates to a method of detecting a light beam, and more particularly to a method of detecting a synchronizing light beam in a light beam scanning system.

2. Description of the Prior Art

In a light beam scanning system including a light deflector such as a rotating polygonal mirror for making lines on a recording material or the like, a synchronizing light beam detecting means is provided for eliminating a jitter in the lines. In a light beam scanning system which records or displays a figure or characters on a recording material or a cathode ray tube, a jitter in the direction of lines should be removed in order to obtain undeformed figures or characters. The jitter is caused by errors in parallelism of the facets of the polygonal mirror, errors in angles of the facets or displacement of the axis of rotation of the rotating mirror from the center thereof. In order to prevent the jitter, it has been known in the art to provide a light beam detecting means in the line of the scanning light beam to obtain a synchronizing signal. The start of the modulation in each line is put into synchronization with the synchronizing signal obtained by the light beam detecting means.

In the above described light beam scanning system in which a light beam detecting means is provided for synchronization, a photodetector which has a definite size of a light receiving aperture is used as the light beam detecting means. The light receiving aperture is positioned on the focal plane of the light scanning system where the light beam is most concentrated in order to enjoy the highest resolving power. The diameter of the focused light beam on the focal plane is about 10 to 100 microns. On the other hand, the surface of the light receiving portion of the photodetector has surface irregularities and carries dusts or the like thereon. Therefore, there is sometimes observed a jitter in the lines which results from the surface irregularities or dusts on the light receiving portion of the photodetector.

SUMMARY OF THE INVENTION

The primary object of the present invention is to provide a method of detecting a synchronizing light beam in a light beam scanning system in which a jitter in the direction of lines of scanning is effectively eliminated.

Another object of the present invention is to provide a method of detecting a synchronizing light beam in a light beam scanning system in which a jitter in the direction of lines is effectively eliminated even when the light beam is deflected in the direction perpendicular to the direction of the lines.

A specific object of the present invention is to provide a method of detecting a synchronizing light beam in a light beam scanning system in which a jitter in the direction of lines is effectively eliminated even if the surface of the light receiving portion of the photoreceptor used for detecting the synchronizing light beam has surface irregularities or dusts or the like thereon.

The above objects of the present invention are accomplished by detecting the synchronizing light beam where the light beam moves at a higher speed than that at which the light beam moves in the lines. The present invention is further characterized in that the detection of the synchronizing light beam is conducted where the diameter of the cross section of the light beam is larger than that of the light beam when the light beam scans the lines.

DESCRIPTION OF THE PREFERRED EMBODIMENTS

Figure 1:
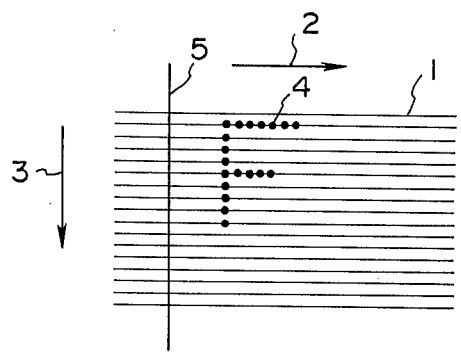
FIG. 1 is a front view of lines and a character carried thereon obtained by the light beam scanning system to which the present invention is applied.

Referring to FIG. 1, a light beam is scanned in the direction of lines 1 as indicated by an arrow 2 and the lines 1 are arranged in parallel in the direction as indicated by an arrow 3. A character 4 is formed of a number of dots on the lines arranged in the form of "F". The dots are obtained by modulating the scanning light beam. A line 5 indicates a position in the lines where the light beam is detected by a photodetector for making synchronization between signals carried by the lines. When the scanning light beam is detected by the photodetector positioned on the line 5, a synchronizing signal is generated. Then, when a predetermined time interval has lapsed, a video signal is generated to obtain an undeformed character 4 as shown in FIG. 1. In the conventional method, however, as mentioned hereinbefore, the character is sometimes deformed because of the surface irregularities of the light receiving portion of the photodetector or due to the existence of dusts or the like on the light receiving portion of the photodetector.

A preferred embodiment of the present invention will be described in detail hereinbelow with reference to FIG. 2. A light beam 7 emitted by a laser beam source 6 transmits through a light modulator 8 which modulates the light beam 7 in accordance with a video signal given thereto. The modulation is an amplitude modulation. The amplitude modulated light beam is then reflected by the facets of a rotating polygonal mirror 9 and is deflected thereby between deflected light beams 10 and 10'. The deflected light beam is focused on a recording material 12 by means of a large focusing lens 11 and forms a light spot thereon. The light spot moves to scan a line 13 on the recording material 12. The recording material 12 is moved in the direction perpendicular to the direction of the line 13.

At little distance behind the recording material 12 on one side thereof where each line starts is provided a focusing lens 14. Behind the focusing lens 14 is provided a photodetector 15. The distance between the recording material 12 and the focusing lens 14 is shorter than that between the focusing lens 14 and the photodetector 15 so that the diameter of the light spot on the recording material 12 is smaller than that of the light spot on the photodetector 15 and the speed of scan of the light beam on the recording material 12 is lower than that of the light beam on the photodetector 15. In other words, the light beam received by the photodetector 15 moves faster than the light beam scanning the lines 13 on the recording material 12.

Since the moving speed of the light beam on the photodetector 15 is higher than that on the recording material 12, the synchronization can be effected more accurately than the conventional method wherein the photodetector is located on the plane of the recording material 12.

Figure 2:
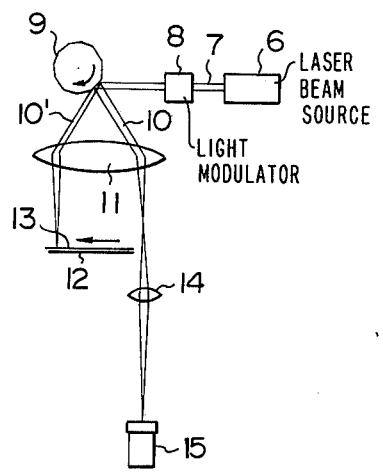
FIG. 2 is a side view showing an embodiment of the present invention.
Figure 3:
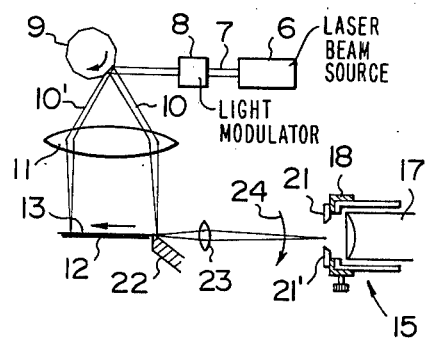
FIG. 3 is a side view showing another embodiment of the present invention.
Figure 4:
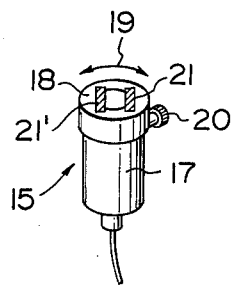
FIG. 4 is a perspective view of a photodetector employed in the embodiments of the present invention as shown in FIGS. 2 and 3.

Another preferred embodiment of the present invention is shown in FIG. 3 wherein the elements equivalent to those employed in the first embodiment shown in FIG. 2 are designated by the same reference numerals. In this embodiment, a mirror 22 is located on one side of the recording material 12 where the line 13 starts for reflecting the light beam from the focusing lens 11 in the direction parallel to the recording material 12. At a little distance from the mirror 22 is provided a focusing lens 23 corresponding to said lens 14 in the first embodiment. The light beam focused by the lens 23 is received by a photodetector 15. The photodetector 15 is illustrated in detail in FIG. 4. The photodetector employed in this embodiment is comprised of a photodetector body 17 and a rotatable holder 18 rotatably mounted on the head of the body 17. The holder 18 has a pair of knife edges 21 and 21' and is rotatable as shown by an arrow 19 to change the orientation of the knife edges 21 and 21' with respect to the direction of scanning of the light beam as indicated by an arrow 24 in FIG. 3. The rotatable holder 18 can be clamped to the body 17 by means of a clamp knob 20. The holder 18 is clamped at a position where the knife edges 21 and 21' are perpendicular to the direction of scanning of the light beam. In this embodiment also, the diameter of the light spot on the photodetector 15 is larger than that on the recording material 12, and the moving speed of the light spot is higher on the photodetector than on the recording material.

In the above described embodiments, the diameter of the light spot formed on the light receiving face of the photodetector 15 is larger than that of the light spot formed on the recording material 12. For example, when the diameter of the light spot on the recording material 12 is 20 microns, the diameter on the light receiving face is 100 microns. On the other hand, the size of dusts on the light receiving face is normally about 10 microns. Therefore, the influence of the dusts is markedly reduced.

The surface of the knife edges 21 and 21' has surface irregularities of about 2 microns. When the light beam is deflected in the direction perpendicular to the scanning, the surface irregularities of the knife edges cause a jitter to appear in the lines. However, as mentioned hereinabove, the order of the surface irregularities, i.e. 2 microns, is much smaller than the diameter of the light spot formed on the light receiving face of the photodetector 15. Therefore, the influence of the surface irregularities of the knife edges is negligible. In more detail, when the diameter of the light spot formed on the light receiving face is as small as the irregularities on the contour of the knife edge, the timing of the detection of the light beam changes as the position where the light beam starts to be received changes in the direction along the edge of the knife. On the other hand, when the diameter of the light spot is much larger than the irregularities, the timing of the detection of the light beam does not change even if the position of the light spot changes along the edge of the knife since the light spot covers both the convex and concave portions of the edge irregularities. Therefore, the jitter is not observed when the diameter of the light spot formed on the photodetector is much larger than that of the light spot formed on the recording material.

In the above described embodiments, the light beam once focused on the recording material 12 is again focused on the photodetector by means of a focusing lens which is located at a longer distance from the photodetector than from the recording material. However, it will be understood that a larger light spot can be obtained by making the light beam diverge. Therefore, without a focusing lens behind the recording material, a light beam having an enlarged light spot can easily be obtained. In such a system, the photodetector is located at a position as shown in FIG. 2 to receive the diverging light beam directly from first focusing lens 11.

I claim:

1. A method of detecting a synchronizing light beam in a light beam scanning system for recording or displaying information by use of a light beam modulated by a video signal wherein the scanning light beam is detected at a predetermined position while the light beam is scanning a line, said light beam being focused to form a light spot on the line wherein the improvement comprises the steps of enlarging the diameter of the light beam after the light beam has passed through a plane including said line before the light beam is modulated in each line, and detecting the light beam where the diameter of the light beam is larger than that of said light spot.

2. A method of detecting a synchronizing light beam as defined in claim 1 wherein the diameter of light beam is enlarged by diverging the light beam.

3. A method of detecting a synchronizing light beam as defined in claim 1 wherein the diameter of the light beam is enlarged by focusing the light beam on a focal plane by means of a focusing lens which is located at a longer distance from the focal plane than from the line.

4. A method of detecting a synchronizing light beam as defined in claim 3 wherein said light beam is reflected by a mirror after the light beam has passed through said plane including the line and before the light beam passes through said focusing lens.

5. A method of detecting a synchronizing light beam as defined in claim 1 wherein said light beam is caused to scan at a higher speed after the light beam has passed through said plane including the line than before the light beam has passed through the plane, and detecting the light beam where the speed of scanning is higher.

* * * * *